Oct. 22, 1963  W. H. HOLZBOOG ET AL  3,107,856
SAFETY CONTROL APPARATUS
Filed Sept. 14, 1960  4 Sheets-Sheet 1
FIG. 1.
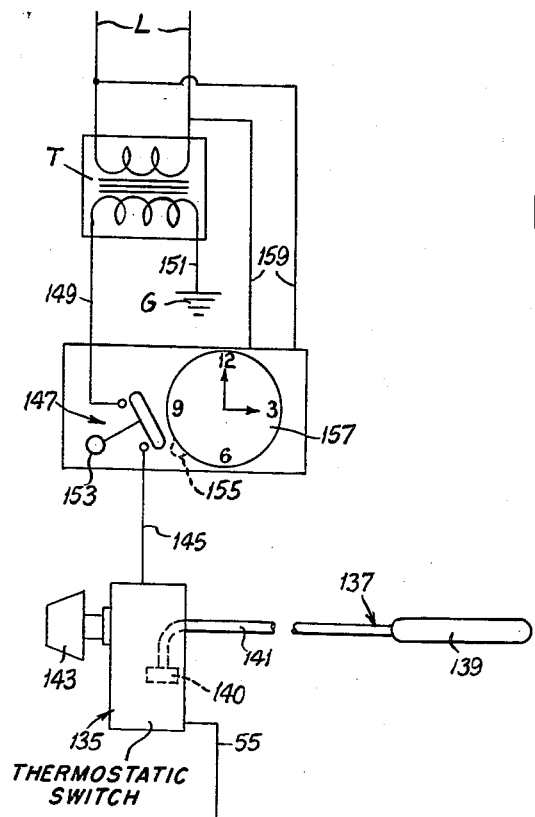
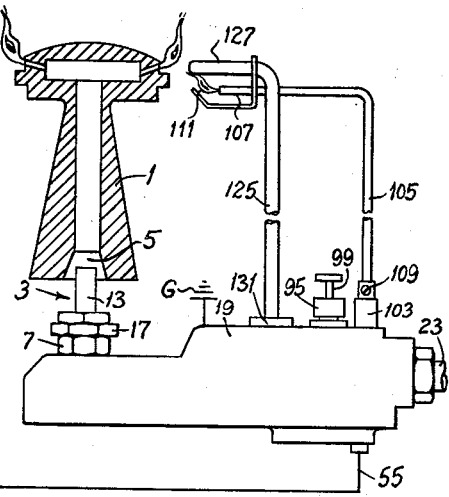
FIG. 8.
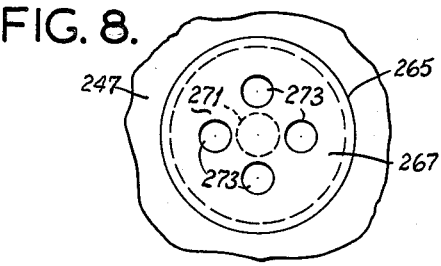
Walter H. Holzboog,
Harold C. Reinhart,
Inventors.
Koenig and Pope,
Attorneys.

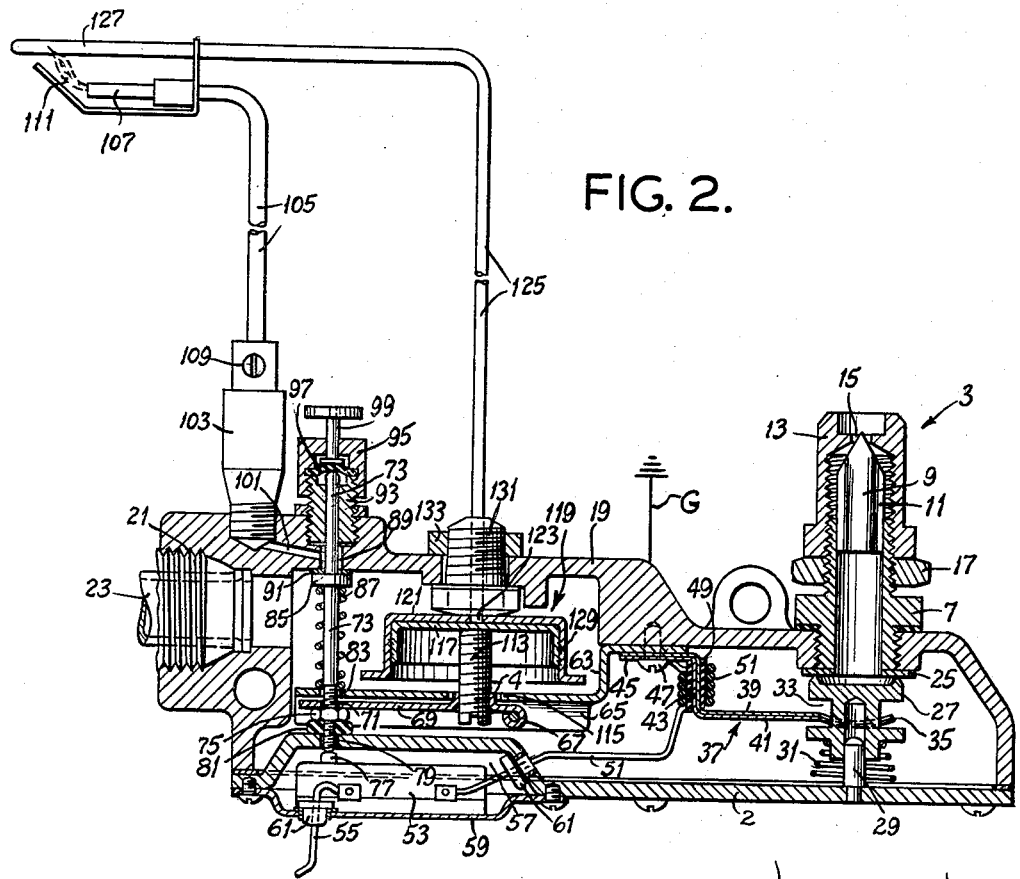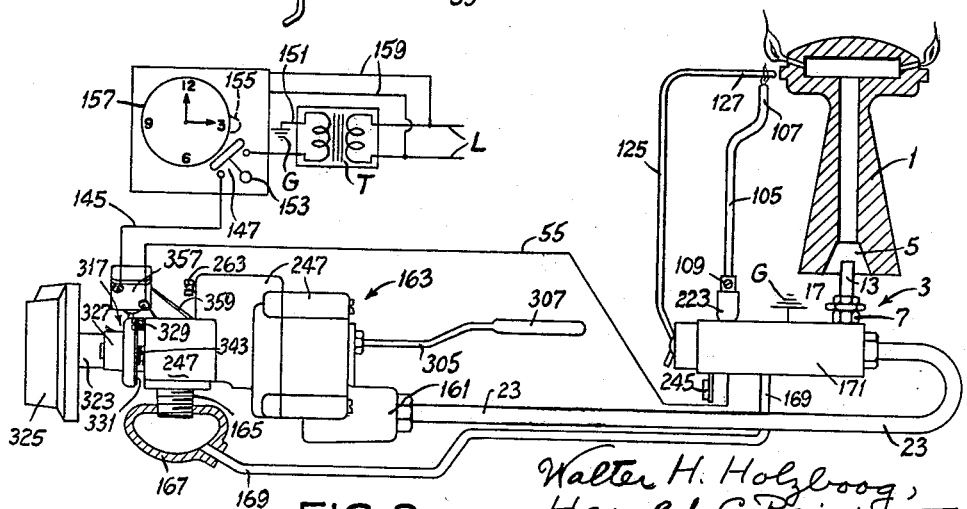

Oct. 22, 1963

W. H. HOLZBOOG ET AL 3,107,856

SAFETY CONTROL APPARATUS

Filed Sept. 14, 1960

Walter H. Holzboog,
Harold C. Reinhart,
Inventors.
Koenig and Pope,
Attorneys.

Oct. 22, 1963    W. H. HOLZBOOG ET AL    3,107,856
SAFETY CONTROL APPARATUS
Filed Sept. 14, 1960    4 Sheets-Sheet 4

Walter H. Holzboog,
Harold C. Reinhart,
Inventors.
Koenig and Pope,
Attorneys.

United States Patent Office 3,107,856
Patented Oct. 22, 1963

3,107,856
SAFETY CONTROL APPARATUS
Walter H. Holzboog, Clayton, and Harold C. Reinhart, Ferguson, Mo., assignors to Micro Controls, Inc., St. Louis, Mo., a corporation of Ohio
Filed Sept. 14, 1960, Ser. No. 55,957
10 Claims. (Cl. 236—1)

This invention relates to gas safety control apparatus for cooking ranges, furnaces, water heaters and the like, and with regard to certain more specific features to temperature-regulating apparatus of this class.

Among the several objects of the invention may be noted the provision of low-cost, reliable and fail-safe gas safety regulator apparatus for controlling burners of gas ranges, furnaces, water heaters and the like; the provision of apparatus of the class described in which a simple form of valve may function both as a regulator and safety valve; the provision of apparatus of the class described which may be electrically controlled either by use of a conventional thermostatic switch or an electrical switch such as forms part of a conventional gas regulator; and the provision of apparatus of this class which provides superior ignition performance in connection with burners controlled thereby. Other objects and features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, FIG. 1 is a diagrammatic view illustrating one form of the invention;

FIG. 2 is a sectional view of a burner and pilot safety valve structure of the invention;

FIG. 3 is a diagrammatic view illustrating another form of the invention;

Figure 9:
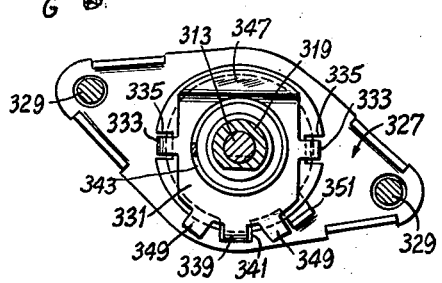
Figure 6:
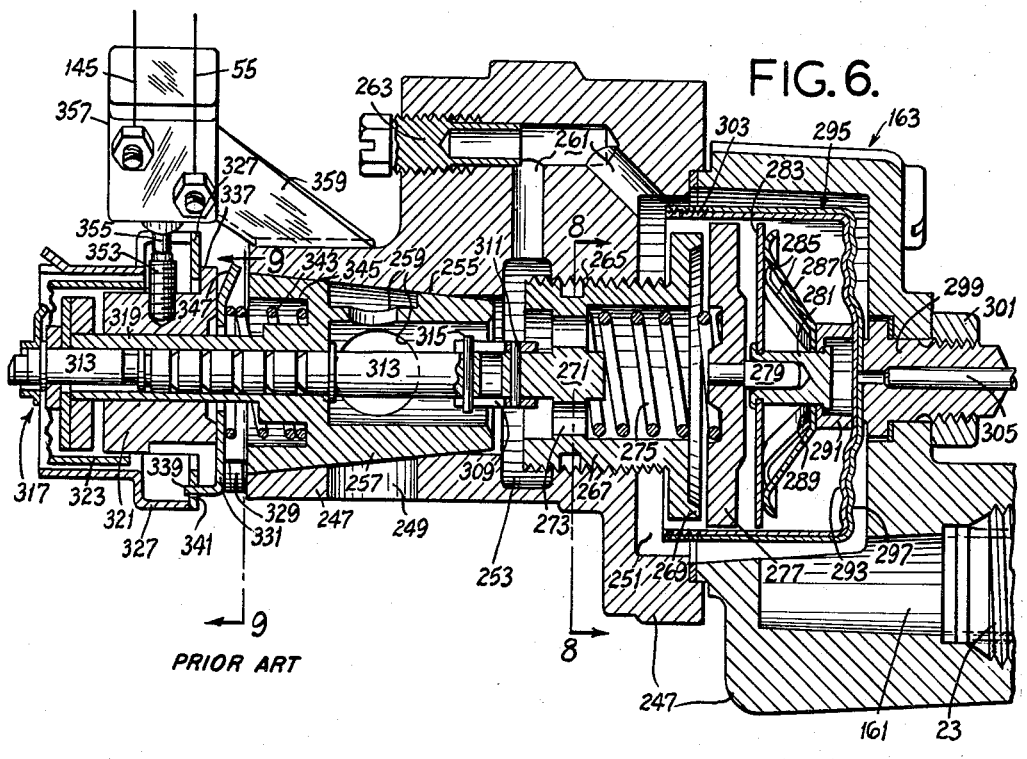
FIG. 6 is an axial section of a conventional thermostatic regulator valve used in connection with the FIG. 3 form of the invention.
Figure 7:
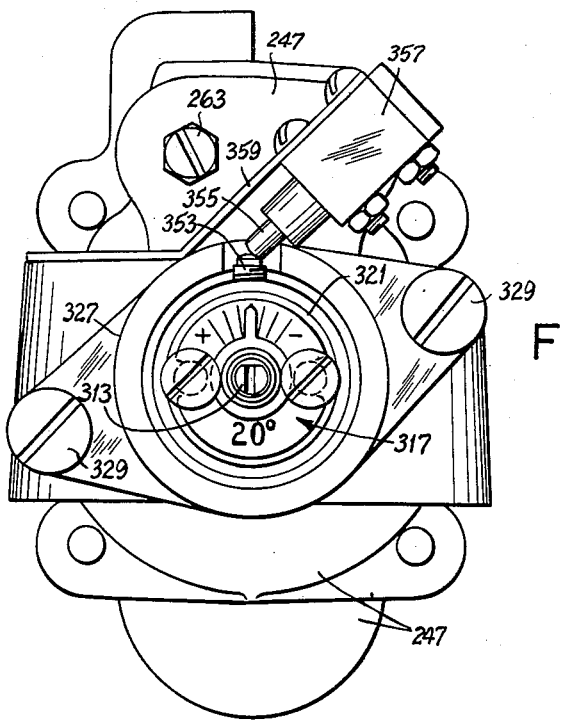
FIG. 7 is a left end view of FIG. 6.

FIGS. 8 and 9 are cross sections taken on lines 8—8 and 9—9 of FIG. 6, respectively.

Corresponding reference numerals indicate corresponding parts throughout the several views of the drawings.

Referring now more particularly to FIG. 1, there is shown at numeral 1 a conventional gas burner for a stove oven, gas water heater, gas heating furnace or the like. Its gas supply fitting is shown at 3, being located at the primary air inlet 5 of the burner 1. The fitting 3 is constituted (FIG. 2) by a nipple 7, at the end of which is fitted an outlet core 9, provided with gas outlet slots 11. Threaded onto the nipple 7 is a sleeve 13 having an outlet port 15, which by adjustable threading of sleeve 13 on nipple 7 controls the gas outflow rate from the nipple 7. A nut 17 is adapted to lock sleeve 13 in any desired adjusted position.

The nipple 7 is threaded into a gas-tight housing 19 forming a gas plenum chamber. Housing 19 has a threaded inlet 21 to which a gas supply pipe 23 is connected. Around the inside end of the nipple 7 is located a valve seat 25. This is engageable by a valve 27 slidable on a guide pin 29 and biased to seating position by a spring 31. Pin 29 is carried on a sealed closure plate 2 of the housing 19. The spring 31 reacts against this plate 2.

Valve 27 is grooved, as shown at 33, for the reception of the forked operating end 35 of a bimetallic valve-control arm 37. This arm has its component of high coefficient of thermal expansion uppermost, as shown at 39, and its component of relatively low coefficient of thermal expansion lowermost, as shown at 41. Thus the arm 37 is thermostatically operative and if heated will bend downward to open the valve 27 against action of spring 31. Upon cooling, it will return to its initial cold position, allowing spring 31 to reclose the valve 27. It is preferable and of significance that the thermostatic action of arm 37 be gradual (i.e., not snap-acting) so that the start of gas flow shall increase gradually, rather than with an explosion-like puff.

Bimetallic arm 37 is provided with an offset portion 43 beyond which its transverse end 45 is fastened to the housing 19 by means of a screw 47. The offset portion 43 is surrounded by an insulating wrapping 49. The wrapping 49 is in turn surrounded by a heater wire 51, one terminal of which is grounded to casing 19 by screw means 47 and the other terminal of which is connected through a normally open switch 53 with a wire 55. Casing 19 is grounded as shown at G. The switch 53 is in an outside portion of a recess 57 formed in the plate 2, this recess being enclosed by a cover 59 screwed to the cover over the recess. The immediate wire leads to the switch pass through insulating and sealing bushings 61. This arrangement of switch 53 outside of the closed housing 19 keeps the switch contacts out of communication with the gas which fills the interior of the housing 19.

Screw means 47 also supports a bracket 63 which is flanged as at 65 for stiffness. Pivoted to the bracket 63 at 67 is a motion-multiplying arm 69. This arm is provided at its movable end with an opening 71, surrounding a pin 73. A nut 75 threaded on pin 73 forms a shoulder therefor. The lower end of the pin 73 enters recess 57 through an opening 79 and contacts with an operating button 77 of the switch 53. Thus when the motion-multiplying arm 69 is pushed down, so is the button 77, thus closing the normally open switch 53. A compressible washer 81 seals the opening 79. The pin 73 also passes freely through an opening 83 in the bracket 63. It also carries an upper valve-forming shoulder 85 which, by means of a spring 87 reacting from the bracket 63, tends to assume a sealing position over an inner end of an outlet port 89 in the housing 19. A packing washer 91 aids the sealing effect. The pin 73 extends above the shoulder 85, loosely through the port 89 and through a sealing screw part 93. Part 93 is enclosed by a nut 95 holding in place a sealing diaphragm 97, underneath which is located the upper end of the pin 73. Slidable in the nut 95 of the diaphragm 97 is a manual control stem 99. By pushing down the stem 99, the valve-forming shoulder 85 may be pushed down to open the port 89 and at the same time press on the button 77 to close switch 53.

Passage 89 has a branch 101 leading to an outlet nipple 103 to which is attached a gas pilot line 105 supplying a pilot burner 107. Numeral 109 indicates an adjustable needle valve for controlling the size of flame 111 which may issue from the pilot burner 107.

Threaded into a sleeve part 4 which is struck out from arm 69 is an adjustable screw 113 which with sleeve 4 extends freely through an opening 115 in the bracket 63. The screw 113 at its upper end contacts the inner flexible bottom 117 of a double-walled cup 119. The outer bottom wall 121 of the cup 119 has an opening 123 which through a nipple 131 is in communication with a capillary tube 125 leading to a bulb portion 127 which contains an expansible fluid as, for example, mercury. The space between the cup walls 117, 121, the volume of tube 125 and the volume of bulb 127 are filled with the expansible fluid, which when heated by the flame 111 will press the inner cup wall 117 against the screw 113, so as to drive the arm 69 anticlockwise to press down on the nut 75. This pushes down the lower end of the pin 73 into engagement with the button 77 of switch 53, thus holding the switch closed. The cup walls 117 and 121 are flanged and welded, as shown at 129, to seal in the operating fluid. The nipple 131 is locked in place by a nut 133. It is apparent from the above that the motion available near the outer end of arm 69 for actuating switch 53 is multiplied with respect to that delivered near the pivoted end of the arm by screw 113. Some flexibility of arm 69 provides for overriding action when the button reaches the end of its motion that closes switch 53.

In FIG. 1, at numeral 135 is shown a conventional adjustable thermostatically operated electric switch. It has a temperature-sensing element 137 which is in a compartment heated by the burner 1. For example, the sensing element 137 may, in the case of a gas range, be in the oven supplied with heat by burner 1; or in the case of a furnace, in the furnace bonnet. In the case of a water heater, this sensing element will be responsive to the temperature of the water. In the form shown, the sensing element 137 is of the expansible-fluid-filled type, in which a material such as mercury in a bulb 139 operates through a capillary tube 141 and expansible capsule 140 to control the switch mechanism in the switch 135. Upon rise of temperature the switch opens, and upon fall it closes. It is to be understood that while the expansible-fluid type of sensing element is shown, some conventional thermostatic switches having other types of temperature-sensing control elements, such as bimetallic thermoelectric or like devices, may be used. Numeral 143 shows a conventional control knob for the thermostatic switch 135, adapted for adjusting the temperature at which its contacts will open and close. Since switches of this general class are known, further elaboration will be unnecessary.

Referring to FIG. 1, the wire 55 is connected to one of the terminals of switch 135. The other switch terminal is wired as indicated at 145 through a conventional timer switch 147 to one side 149 of a low-voltage supply circuit, the other side 151 of which is grounded as shown at G. The circuit 149, 151 is energized from a 110 v. power line L through a voltage step-down transformer T. The switch 147 may be either manually operated from a handle 153 or from the cam 155 of a timer 157. Timer 157 is energized over leads 159 from line L. Since timer switches of this type are well known, further description will not be needed.

Operation of the preferred form of the invention above described is as follows:

Assume that in a range oven to be heated by the burner 1 the bulb 139 is located in the oven served by burner 1; that gas pressure is available in line 23; and that the oven is cold and the pilot flame 111 out (so indicated by dotted lines illustrating it). The construction is then as shown in FIG. 2. Valves 27 and 85 are closed and therefore gas from the line 23 in the casing cannot escape anywhere from the system; that is, either from the gas supply fitting 3 or the pilot 107. This gives complete protection against the dangers that heretofore existed as regards the possibility of gas leakage either from an extinguished main burner or from an extinguished pilot burner.

To light pilot burner 107, the control stem 99 is pressed in. This opens valve 85 and admits gas from the housing 19 through ports 89, 101, nipple 103, line 105 via adjusting valve 109 to the pilot burner 107. The escaping gas is ignited at 111, and by adjustment at the valve 109 its proper size is determined. While continuing to hold down the control stem 99, the flame 111 is permitted to burn until the bulb 127 is sufficiently heated to expand the fluid contained therein, which through line 125 communicates pressure between the bottoms 117 and 121 of the cup 119. The bottom 117 moves against screw 113, which rotates the motion-multiplying arm 69. This presses down on the nut 75 to hold the lower end of stem 73 in engagement with button 77 of switch 53, thus holding shut the latter. Depression of arm 69 also holds open valve 85, so that now, although the stem 99 is released, the pilot flame 111 will continue to burn and switch 53 will remain closed as long as the pilot flame 111 continues to burn.

Assume next that the timer switch 147 is closed, either manually or by operation of the timer 157. This completes the circuit from 149 through 145, thermostatic switch 135, which is then closed because its sensing element 137 is cold. Current then passes over wire 55 through the prepared (closed) switch 53 and the heater wire 51, the circuit being closed through the ground G. The result is that the bimetallic control arm 37 bends downward, and in a gradual manner opens the valve 27 to admit gas through the fitting 3 to the burner 1. The gradual opening function of the valve 27 is of considerable importance, since it prevents the usual inrush or puff of gas that has heretofore occurred in former burners. Thus the gas from burner 1 is initially ignited from the pilot flame 111 at a low burning rate and gradually increases the burning rate as valve 27 opens to full flow. This heats the space about the temperature-sensing element 137. When a predetermined temperature has been reached as determined by the proper setting of handle 143, the switch 135 opens, which deprives heater coil 51 of current, whereupon the thermostatic control arm 37 rises to its cold positon, gradually closing valve 27. The gradual closing function of valve 27, as well as its gradual opening function above described have the additional advantage of making temperature changes less abrupt in the heated space.

The burner 1 is shut off by opening switch 147 either manually or by action of the timer 157. It may also be shut off by reducing the temperature setting at 143 at which switch 135 calls for heating. It will then remain off until heat is called for at the lower temperature setting.

If the pilot flame 111 becomes extinguished for any accidental or other reason, the fluid in 127, 125 and cup 119 cools and shrinks. This allows spring 87 to lift the stem, thus closing pilot valve 85 and depriving heater coil 51 of currrent by opening of switch 53. Therefore, the thermostatic arm 37 must remain in its cold position, allowing the burner or main gas supply valve 27 to shut.

The above-described form of the invention is the preferred form because of its complete safety and simplicity of operation without sacrifice of excellent control functions. Its simplicity arises from the fact that comparatively nonabrupt temperature control operation is obtained by the gradual on-off action of valve 27, and the valve per se is easy to construct. Its complete safety arises from the fact that, unlike most pilot-operated devices of this class, no gas can escape from either the pilot or the burner when the pilot is extinguished, as by accident.

The invention is also useful in connection with a prior known gas regulator such as illustrated at 163 in FIG. 6, which takes the place of switch 135 of FIG. 1. In FIGS. 3–9, like numerals designate like parts. The gas line 23 is connected between a casing structure shown in FIGS. 4 and 5 and the outlet 161 of such a gas regulator 163. In general, the regulator 163 has an inlet 165 connected with a main gas pipe 167. A pipe 169 leads from the main 167 to the valve control construction shown in FIG. 4. Although the regulator is of generally known type, some (though not all) details of it are described for a full understanding of this form of the invention. This will be done below after a description is given of the alternate control valve structure of FIG. 4.

Figure 4:
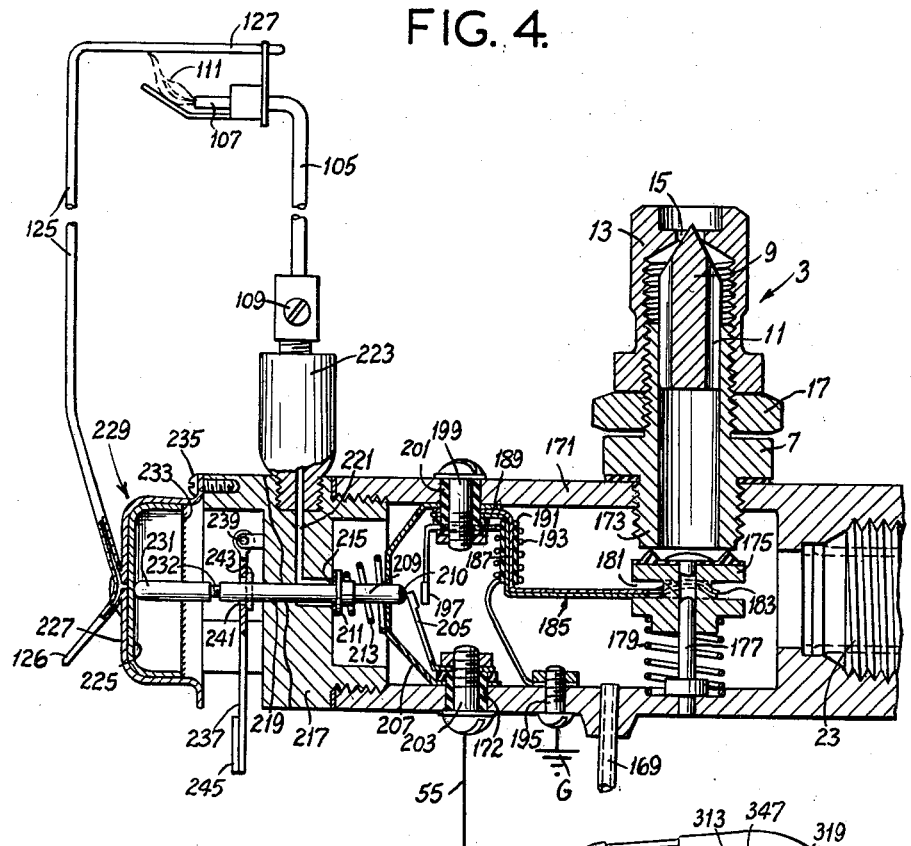
FIG. 4 is a view similar to FIG. 2 but showing an alternate form of burner and pilot valve structure adapted for the form of the invention shown in FIG. 3.
Figure 5:
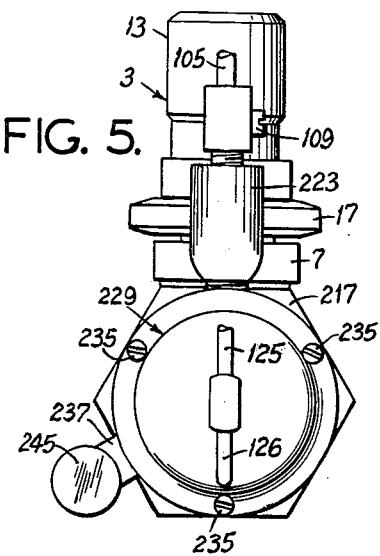
FIG. 5 is a left end view of FIG. 4.

Referring to FIG. 4, the valve control comprises a housing 171, forming a gas plenum chamber, to which the gas supply fittting 3 is attached. This fitting is essentially the same as that shown in FIG. 2, like numerals designating like parts in connection therewith. At its lower end is a control valve seat 173. At 175 is shown the control valve slidable on a stem 177 and biased toward shut position by a spring 179. This is grooved as shown at 181 for the reception of the forked operating end 183 of a bimetallic thermostatic control arm 185 (like the thermostatic control arm 37 in FIG. 2) having an offset portion 187 and an end 189 carried on the inside of the housing 171. The offset portion 187 is surrounded by electrical insulation 191 and a heater coil 193, one end of the latter being connected with a terminal 195, grounded at G. The other end of the coil 193 is connected with a switch contact terminal 197. Numeral 199 indicates fastener means for the end 189 of the thermostat 185. Insulation indicated generally at 201 keeps the heater 193 and contact 197 out of conductive relation to the casing 171. At 203 is shown a support for a resilient switch contact terminal 205, adapted to move to and from contact terminal 197 but normally sprung therefrom. Conductor 55 is in conductive relation with terminal 205 and the latter is electrically insulated from the casing 171 by a sleeve of insulation 172.

At numeral 207 is shown a bracket for guiding the inner end of a control stem 209 which carries a valve-forming collar 211. Stem 209 has an insulating head 210 engaging terminal contact 205. A spring 213, reacting between the bracket 207 and the collar 211, biases the stem 209 to the left into closing position of the valve 211 over an outlet port 215. This outlet port is in an enclosing head 217 for the housing 171. This head also forms an additional guide 219 for the stem 209. The port 215 is in communication through a passage 221 with a nipple 223 from which extends the gas pilot line 105, communication being through needle adjusting valve 109. Line 105 extends to pilot 107 for producing pilot flame 111. In this case the bulb 127 connects over line 125 with the space between relatively movable bottoms 225 and 227 of a thermostatic cup 229. The line 125 is sealed at 126.

An adjustable extension 231 from the stem 209 engages the inside of the movable bottom 225 (see threads 232). The flanged portions of the cup 229 are welded at 233. The cup assembly 229 is attached to the head 217 by screws, as indicated at 235. At numeral 237 is shown an arm pivoted at 239 to the head 217 and having therein an opening 241 through which the stem 209 extends freely. Adjacent the opening, the stem carries a collar 243. At the outer end of the arm 237 is a finger pad 245, by means of which the arm may be swung manually to the right. In such event, the stem 209 is moved to push contact terminal 205 into engagement with contact terminal 197. The stem 209 will also be pushed to the right when the bottom 225 of cup 229 is pushed by expansion of fluid from bulb 127 and line 125. This holds the switch contacts 197 and 205 closed, as long as flame 111 is ignited.

When stem 209 is pushed and held to the right, pilot supply gas flows through casing 171, open port 215, passage 221 and thence through 223, 109, 105 and to the pilot burner 107, where it may be ignited. Initial movement of stem 209 to the right may be accomplished by manual action on the lever 237. After the flame 111 is ignited, the lever is held in position to the right long enough for pressure to be generated in the bulb 127 and line 125, to push bottom 225 to the right. This holds together the switch contacts 197 and 205, where they will remain as long as the pilot flame 111 burns. If the flame goes out, the valve 211 will be returned to closed position by spring 213, since pressure between cup bottoms 225 and 227 will have been reduced. This separates the contacts 197 and 205 and closes the pilot valve 211.

Referring now more particularly to FIG. 6, numeral 247 indicates a two-part casing, in one part of which is gas inlet 249 and in the other part of which is the gas outlet 161 to pipe 23. The outlet 161 is in communication with an inner chamber 251. At 253 is shown a second inner chamber, part of which is tapered as shown at 255 to receive a hollow tapered plug valve 257. This valve contains ports 259 which, when the valve is turned from the shut-off position shown, communicate with the inlet port 249 to admit gas via connection 165 from line 167. Numeral 261 indicates a by-pass connection between chambers 253 and 251 through which a regulated flow of gas passes, the amount being under control of adjustable valve 263.

Connecting the chambers 253 and 251 is a threaded opening 265 in which is a hollow threaded bushing 267 formed at its right-hand end as a valve seat 269. The bushing 267 includes a wall part 271 in which are openings 273. The wall part seats a spring 275 which pushes on an axially movable control valve 277.

The valve 277 carries a pin 279 on which is carried a bushing 281. On the left-hand end of the bushing is riveted a plate 283 upon which rest the ends of spring fingers 285 of a rosette spring 287. The spring 287 has a central collar 289, welded to a sleeve 291 which is attached to the bottom 293 of a thermostatic cup 295, like cups 119 and 229 shown in FIGS. 2 and 4. Sleeve 291 slides on bushing 281. The outside bottom 297 of the cup 295 is affixed to a hollow nipple 299, held to the body 247 by a nut 301. The margins of the cup parts of cup 295 are welded, as shown at 303. Connected to nipple 299 is a capillary tube 305 which extends to a liquid-containing bulb 307 located in the space heated by burner 1. Upon heating the bulb 307, the cup bottom 293 moves from the fixed bottom 297. Pressure is thus transmitted through sleeve 291, spring 287, plate 283, pin 279 to the valve 277. If excess pressure is encountered after valve 277 contacts seat 269, the resilient fingers 285 of spring 287 will deflect, allowing sleeve 291 to overrun on the bushing 281. The timing of the event of closure of valve 277 on seat 269 depends upon the position of the seat, which is controlled by rotating the threaded bushing 267 in threaded opening 265. This rotation is accomplished by a forked member 309 connected with the bushing 267 by a pin 311. At numeral 313 is shown a control stem carrying a pin 315, located in the forked member 309. This forms a rotary driving connection between stem 313 and bushing 267 while admitting of relative axial movement between them. Thus the axial position of seat 269 may be adjusted if stem 313 is turned.

The stem 313 has an adjustably fixed angular position in the plug valve 257. Angular adjustment of the fixed position, for calibration purposes, is accomplished by means of a releasing and locking arrangement between the stem and a sleeve extension 319 of the valve. This arrangement is shown generally at 317 but further description will be unnecessary, since its particulars form no part of the present invention. For the purpose of this description and in normal operation, stem 313 and valve 257 rotate together.

Slidably keyed on the sleeve 319 of valve 257 is an arbor 321. This arbor 321 carries in rotary interlocking engagement therewith the removable sleeve 323 of a control handle 325. It is by this means that the valve 257, and hence stem 313, may be turned together. At 327 is shown a bracket supported from the body 247 by screws 329. This bracket 327 surrounds the arbor 321. At 331 is shown a rocking latch plate surrounding extension 319 (FIGS. 6 and 9). Plate 331 has bent ears 333 located loosely in notches 335 of a flange 337 of arbor 321. Hence the latch plate 331 and the arbor 321 may rotate together while the plate 331 may rock axially. The latch plate has a tongue 339 which is engageable and disengageable with a notch 341 of the bracket 327. Engagement occurs when a spring 343, reacting from a recess 345 of valve 257, presses the latch plate 331 against the arbor 321. But upon pushing the arbor 321 to the right by means of handle 325 and sleeve 323, a bent ear 347 thereon engages the valve body 247, whereupon the latch plate 331 will axially rock anticlockwise to remove the tongue 339 from the notch 341. This permits rotation of the valve 257 to its open position. When the handle 325 is in its initial position as shown in FIGS. 6 and 9, the rotary assembly of which the valve 257 forms a part is locked by the fact that the tongue 339 is in notch 341. Unlocking is accomplished simply by pushing in the handle and then rotating the same. As shown in FIG. 9, tongues 349 on the latch plate 331 are engageable with a struck-out tongue 351 of bracket 327 to form limiting stops for the rotation.

Referring again to FIG. 6, at numeral 353 is shown a lug threaded into the arbor 321 for engagement with the operating button 355 of a switch 357, mounted by a bracket 359 on the body 247. Switch 357 is connected between wires 55 and 145 (FIG. 3) and is normally closed but held open when the lug 353 engages button 355, as illustrated in FIG. 6. Upon pushing in the handle 325 with its sleeve 323, the arbor 321 will be pushed in. At this time and thereafter upon rotating them anticlockwise (viewed from the left in FIG. 6) the lug 353 recedes from the button 355, allowing switch 357 to close. Anticlockwise rotation also opens the plug valve 257 and adjusts the bushing 267 axially to adjust the valve seat 269. This adjusts the temperature at which the valve 277 will close in response to movement caused by expansion of fluid in the system 307, 305 and cup 295.

Operation of the form of the invention shown in FIGS. 3-9 is as follows:

Assuming timer switch 147 and regulator switch 357 to be open, no current flows in wire 55. Valve 175 is shut. Lever 237 is manually pushed to the right, thus closing terminal contacts 197 and 205. Valve 211 will open and gas flow from line 167 over pipe 169 to casing 171 and escape through passages 215, 221 and over pipe 105 to the pilot 107, where flame 111 will be ignited. Lever 237 is held in until the flame 111 heats and expands the liquid in the bulb 127 and 125. This pushes the bottom 225 of the cup 229 to the right, thereby pushing stem 209 to the right to hold contacts 197 and 205 closed. The lever 237 may then be released without terminal contacts 197, 205 separating. Thus the system is prepared for operation.

Next assume that timer switch 147 closes. Switch 357 is open until control handle 325 is pushed to the right and then turned anticlockwise (viewed from the left in FIG. 6). This closes switch 357, opens plug valve 257, and sets valve seat 269 for the desired temperature. Closing of the switch 357 energizes the circuit between ground connections as follows: 145, 55, closed terminal contacts 197, 205 and heater coil 193. Heating of the thermostatic arm 185 gradually opens valve 175. Gas admitted by the open plug valve 257 flows through the hollow bushing 267, open valve 277, outlet 161, pipe 23, to the interior of the housing 171. Since valve 175 is open, this gas escapes through gas supply fitting 3 to the burner 1, which ignites from the pilot flame 111. Rise in temperature of the space affecting bulb 307 tends to close valve 277 to reduce the amount of heating gas reaching burner 1. Upon reduction in temperature of this space, the valve 277 tends to reopen.

The temperature at which valve 277 closes is determined by the rotary position of the handle 325 as it affects the threaded position of bushing 267 in the threads 265. The purpose of the by-pass connection 261 is to supply a minimum amount of gas which can flow between compartments 253 and 251 independently of the position of valve 277. Thus even though the valve 277 may temporarily close or nearly close in response to rise in temperature, the burner 1 will receive enough gas to remain lighted at a low rate of burning. When the handle 325 is returned to its initial position, lug 353 contacts button 355 of switch 357, thereby opening it and depriving heater wire 193 of current. Thereupon the thermostatic arm 185 recloses valve 175. Pilot valve 211 remains open as long as pilot flame 111 burns. If for any reason this flame is extinguished, valve 211 closes. Thus this form of the invention also operates safely. It may be remarked, however, that the FIG. 2 form of parts in housing 19 is superior to the form of those in housing 171 of FIG. 4, because in the former the parts of switch 53 are outside of the contained gas, whereas in the FIG. 4 form the switch contacts 197, 205 are in the contained gas. The FIG. 4 form is satisfactory, since pure gas does not constitute an explosive mixture subject to ignition by any switch sparking. But the FIG. 2 form is best, since even if air accidentally infilters housing 19, any sparks from switch 53 are not accessible to it. It will be understood in this connection that the assemblies of FIGS. 2 and 4 may be interchanged in FIGS. 1 and 3. In such case, pipe 169 will be used in the FIG. 2 arrangement and the hole left by removal of pipe 169 from the FIG. 4 assembly will be plugged.

In view of the above, it will be seen that the invention is useful (as illustrated in FIG. 1) without the former FIG. 6 form of conventional regulator. In this case (FIG. 1) the conventional thermostatic switch 135 is used. But the invention is also useful with such a regulator as illustrated in FIG. 3. In both forms of the invention the valve 75 or 175, as the case may be, acts as a fail-safe safety feature against accidental leakage of gas from the burner 1. In both forms of the invention the thermostatically controlled pilot valve 85 or 211, as the case may be, acts as a fail-safe safety feature against accidental leakage of gas from the pilot burner, should it be extinguished.

It will be observed that in both forms of the invention thus far described the pilot valve 85 or 211 remains open as long as the pilot flame 111 burns, and that when this flame goes out the pilot valve automatically closes. In addition, extinguishment of the pilot flame opens switch (53) or switch (197, 205), as the case may be, thus depriving the thermostat (37) or thermostat (185), as the case may be, of the possibility of receiving any heat from its heater. This assures that no gas can escape from the main burner gas supply fitting 3 in the absence of a pilot flame.

The above description and attached drawings mention and show the use of a transformer to reduce the line voltage. It is to be understood that control apparatus will operate just as satisfactorily with 110 volts.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Control apparatus for a gas heating burner having an associated pilot burner; comprising means forming a gas passage having a gas inlet, a first heating-gas outlet therefrom for the heating burner and a second pilot-gas outlet therefrom for the pilot burner, a first heating-gas valve movable to open and close the first gas outlet, a second pilot-gas valve movable to open and close the second gas outlet, thermostatic means adapted to open and close said first valve, a heater for the thermostatic means, said thermostatic means being adapted when heated by said heater to open said first valve and to close it upon cooling, an electric circuit including a switch controlling the heater, said switch adapted when closed to cause the heater to heat said thermostatic means and thereby open said first valve, and operating means connecting said second valve and the switch adapted for movement to one position simultaneously to close the switch and open the second valve and adapted for movement to another position simultaneously to open the switch and close the second valve.

2. Apparatus according to claim 1, wherein said thermostatic means is of the type which is gradually movable in response to temperature changes.

3. Gas control apparatus for a gas heating burner having an adjacent pilot burner, a gas chamber having a gas inlet, a heating-gas outlet for the heating burner and a pilot-gas outlet for the pilot burner, a heating-gas valve movable to open and close the heating burner gas outlet, a pilot valve movable to open and close the pilot-gas outlet, thermostatic means adapted to open and close said heating-gas valve, an electric heater for the thermostatic means, said thermostatic means when heated thereby adapted to open said heating-gas valve and to close it upon cooling, an electric circuit containing and controlling the heater and including a normally open switch, means connecting said pilot valve and the switch adapted to close the switch simultaneously with the opening of the pilot valve, manual means adapted to open the pilot valve, and thermostatic apparatus operative upon said connecting means only in response to flame from said pilot burner to hold said pilot valve open and to hold said switch closed.

4. Apparatus according to claim 3, wherein said thermostatic apparatus comprises fluid-filled expansible chamber means adapted to be heated by said flame and operative by expansion upon said connecting means through a movable connecting means therewith.

5. Apparatus according to claim 4, wherein said movable connecting means is constituted by a motion-multiplying mechanism.

6. Gas control apparatus for a gas heating burner having an adjacent pilot burner, a gas plenum chamber having a gas inlet, a heating-gas outlet for the heating burner and a pilot-gas outlet for the pilot burner, a heating-gas valve movable to open and close the heating burner gas outlet, a pilot valve movable to open and close the pilot-gas outlet, first thermostatic means adapted to open and close said heating-gas valve, an electric heater for the first thermostatic means, said first thermostatic means when heated thereby adapted to open said heating-gas valve and to close it upon cooling, an electric circuit connected with the heater and including a normally open first switch, means connecting said pilot valve and the first switch adapted to close the first switch simultaneously with the opening of the pilot valve, a second switch in series circuit connection with said first switch, and second thermostatic means controlling said second switch to open it in response to heat of the heating burner.

7. A gas control unit for a gas heating burner comprising a gas plenum chamber having a gas inlet, a pilot burner attached to the chamber, a heating-gas outlet for the heating burner and a pilot-gas outlet communicating with the pilot burner, a heating-gas valve movable to open and close the heating burner gas outlet, a pilot valve movable to open and close the pilot-gas outlet, thermostatic means in said chamber adapted to open and close said heating-gas valve, an electric heater in said chamber adjacent to the thermostatic means, said thermostatic means when heated thereby adapted to open said heating-gas valve and to close it upon cooling, a normally open switch attached to said chamber and electrically connected with the heater, and means in the chamber connecting said pilot valve and the switch adapted to close the switch simultaneously with the opening of the pilot valve.

8. A unit according to claim 7, wherein said switch is supported exteriorly on the unit.

9. A gas control unit for a gas heating burner having an adjacent pilot burner comprising a gas plenum chamber having a gas inlet, a pilot burner attached to the chamber, a heating-gas outlet for the heating burner and a pilot-gas outlet communicating with the pilot burner, a heating-gas valve in the chamber movable to open and close the heating burner gas outlet, a pilot valve in the chamber movable to open and close the pilot-gas outlet, first thermostatic means in the chamber adapted to open and close said heating-gas valve, an electric heater in the chamber adjacent the first thermostatic means, said first thermostatic means when heated thereby adapted to open said heating-gas valve and to close it upon cooling, a normally open switch electrically connected with the heater, coordinating means in the chamber connecting said pilot valve and the switch adapted to close the switch simultaneously with the opening of the pilot valve, and second thermostatic means connected with the chamber adapted in response to a flame from the pilot burner to hold said pilot valve open and to hold said switch shut.

10. A unit according to claim 9, wherein said second thermostatic means is of the expansible-fluid chamber type in which part of the expansible-fluid chamber is in the plenum chamber, and including a motion-multiplying mechanism in the chamber forming part of said coordinating means.

References Cited in the file of this patent

UNITED STATES PATENTS

| | | |
|---|---|---|
| 2,118,443 | McCorkle | May 24, 1938 |
| 2,231,986 | Beam | Feb. 18, 1941 |
| 2,237,577 | Ray | Apr. 8, 1941 |
| 2,270,722 | Beam | Jan. 20, 1942 |
| 2,379,124 | Wasson | June 26, 1945 |
| 2,387,164 | McCarty | Oct. 16, 1945 |
| 2,438,275 | Fell et al. | Mar. 23, 1948 |
| 2,962,092 | Thornbery | Nov. 29, 1960 |